UNITED STATES PATENT OFFICE.

CYRUS B. DOTY, OF CORTLAND, NEW YORK.

IMPROVEMENT IN COLORING BRICKS.

Specification forming part of Letters Patent No. 6,102, dated February 6, 1849.

*To all whom it may concern:*

Be it known that I, CYRUS B. DOTY, of Cortland, in the county of Westchester and State of New York, have invented a new and Improved Process for Coloring Bricks; and I do hereby declare the following to be a full, clear, and exact description of the same.

The nature of my invention consists in providing certain suitable facings upon the outside of bricks, by which I obtain a uniform color or an ornamental surface, either at pleasure, the same being accomplished as follows, viz:

I mix with the molding-sand usually used in the manufacture of wet bricks to cause them to be relieved from the mold a quantity of any suitable coloring material—that is, material that will burn to a given color, which is generally found best when a mineral coloring-matter is used—and this I vary according to the color I wish to produce—viz., red, yellow, blue, green, brown, stone, or other colors. I mix the coloring-matter in quantity as practice shall dictate for the varieties and shades of color to be produced—that is, the quantity of coloring materials and molding-sand, as before named. Next the clay is prepared in the usual manner in the pug-mill by mashing or grinding, and from this the mold is to be filled, also in the common way. The molds to receive the clay, by its being pressed into them, are coated or sanded with the mixed coloring material and sand—that is, the molds are wet, and while quite wet are dipped into this mixture of color and sand. The mold is then, while the mixture adheres to it, placed in the machine or press, and by the press is filled with clay. The pressure of the clay into the mold to a solid consistency causes all the mixture to adhere to the molded clay or brick, and the pressure it has received has forced the main body of the mixture into and upon the surface of the bricks. In the burning practice has clearly illustrated that the heat with the action of the fire in burning tends to, and really does, strike the coloring more deeply into the surface, and quite sufficiently deep for all practical purposes—that is to say, about one-eighth of an inch, more or less. Thus it will be seen that this invention is very economical, as well as useful, as but a small quantity of coloring material is required in any case. While it would seem to persons unacquainted with the practical operation of brick-making as of slight value, its usefulness will be apparent to the practical, and the more particularly so to those who may chance to have clay which burns of irregular or unsatisfactory colors, which, unfortunately, embraces a large majority of the clay in most of the sections of our country, while some are directly the reverse.

For face-bricks it is usually the practice to dry them partly in the sun after the mold-pressing before described, and then to press them again, by which a better and smoother surface is produced. This may also be done with these surface-bricks, and will much improve them in the respects named. This method of surfacing bricks has been found more practical and useful than the more common way of mixing clay and coloring materials and grinding them up together, inasmuch as this gives uniformity to the surfaces, which the other never could do. It may not be improper to state that in the New York markets colored bricks made in this way have, owing to their superiority, always sold for from two to two and a half dollars per thousand more than any other of the best bricks to be purchased, while the cost was not twenty-five cents greater than that of common bricks.

My invention consists in the discovery that distillation takes place in sufficient amount during the burning of the bricks to cause the permanent incorporation of coloring material into the surface sufficiently deep to meet all requirements, when it has been pressed in before the burning, as well as that pressing the coloring-matter onto the surface is better than mixing with the clay, and the proper time and way of applying the same. In case of the coloring being uneven or incomplete over the entire surface required by the pressure in the molding process, it may be again sanded with the mixture before the second pressing. Indeed, when I wish to ornament bricks by clouding or marbling the surface I put the coloring on damp immediately preceding the second pressure and in the precise ornaments I wish to produce. I then press it as described in the second pressure, and when burned I have bricks ornamented as desired—that is, to imitate marble or other stones, &c., and that as smooth and beautiful as an artificial stone, for laying floors, walks, &c., as well as for building-bricks.

I do not claim the mixing of clay with coloring materials for the purpose of coloring bricks, as that has been done before; but What I do claim as my invention, and desire to secure by Letters Patent, is—

The peculiar process and manipulations of mixing coloring materials with the molding-sand for the surface of bricks and the pressing the same upon and into the surface so as to produce bricks of a uniform color upon the surface, as well as of a uniform shape and smoothness, the same being effected with greater economy than by mixing a sufficient quantity of coloring-matter to color the whole body of the brick, and this regardless of any particular coloring-matter or especial color to be produced when the bricks are burned, all of which is herein described and set forth.

CYRUS B. DOTY.

Witnesses:
J. L. KINGSLY,
R. F. BERWICK.